US010484415B1

(12) United States Patent
Peterson (10) Patent No.: US 10,484,415 B1
(45) Date of Patent: Nov. 19, 2019

(54) SYSTEMS AND METHODS FOR DETECTING SECURITY RISKS IN NETWORK PAGES

(71) Applicant: Vantiv, LLC, Symmes Township, OH (US)

(72) Inventor: Brant Peterson, Denver, CO (US)

(73) Assignee: Worldpay, LLC, Symmes Township, OH (US)

( * ) Notice: Subject to any disclaimer, the term of this patent is extended or adjusted under 35 U.S.C. 154(b) by 159 days.

(21) Appl. No.: 15/381,908

(22) Filed: Dec. 16, 2016

(51) Int. Cl.
*G06Q 20/40* (2012.01)
*G06Q 20/02* (2012.01)
*H04L 29/06* (2006.01)
*G06Q 30/02* (2012.01)

(52) U.S. Cl.
CPC ....... *H04L 63/1433* (2013.01); *G06Q 20/401* (2013.01); *G06Q 20/02* (2013.01); *G06Q 20/40* (2013.01); *G06Q 30/02* (2013.01); *H04L 63/14* (2013.01)

(58) Field of Classification Search
CPC ...... G06Q 20/02; G06Q 20/40; G06Q 20/401; G06Q 20/4016; G06Q 20/42; G06Q 20/027; G06Q 30/02; G06F 21/10; G06F 17/30864; H04L 63/105; H04L 67/1097; H04L 63/14; H04L 63/1433; H04W 4/80
USPC ........ 726/2, 25; 707/709; 705/26.41, 40, 44, 705/26.8, 65, 66; 709/224
See application file for complete search history.

(56) References Cited

U.S. PATENT DOCUMENTS

| 7,765,481 B2* | 7/2010 | Dixon | G06Q 30/02 |
| | | | 705/26.8 |
| 8,423,476 B2* | 4/2013 | Bishop | G06Q 20/027 |
| | | | 705/66 |
| 2007/0245403 A1* | 10/2007 | Ginter | G06F 21/10 |
| | | | 726/2 |

(Continued)

OTHER PUBLICATIONS

E-Commerce Applications: Vulnerabilities, Attacks and Countermeasures by P. S. Lokhande and B. B. Meshram International Journal of Advanced Research in Computer Engineering & Technology (IJARCET) vol. 2, Issue 2, Feb. 2013 pp. 11 (Year: 2013).*

*Primary Examiner* — Brandon S Hoffman
*Assistant Examiner* — Ali H. Cheema
(74) *Attorney, Agent, or Firm* — Bookoff McAndrews, PLLC (57) ABSTRACT

Embodiments include methods and systems for detecting security risks in network pages, comprising providing at least one secure transaction page to a secure transaction provider, the secure transaction page enabling the secure transaction provider to request secure transactions, determining a request rate for the secure transaction page associated with the secure transaction provider, determining a predetermined threshold for a change in request rate for the secure transaction page by the secure transaction provider, determining that the predetermined threshold, for the change in request rate for the secure transaction page by the secure transaction provider, has been exceeded, and providing a notification to the secure transaction provider based on the determination that the predetermined threshold, for the change in request rate for the secure transaction page by the secure transaction provider, has been exceeded.

17 Claims, 5 Drawing Sheets

(56) References Cited

U.S. PATENT DOCUMENTS

| | | | | |
|---|---|---|---|---|
| 2011/0131322 A1* | 6/2011 | Aust | ............... | H04L 67/1097 |
| | | | | 709/224 |
| 2012/0030066 A1* | 2/2012 | Stringfellow | .......... | G06Q 20/02 |
| | | | | 705/26.41 |
| 2013/0041881 A1* | 2/2013 | Wierman | ................ | H04L 67/22 |
| | | | | 707/709 |
| 2014/0316981 A1* | 10/2014 | Muthukrishnan | ...... | G06Q 20/02 |
| | | | | 705/40 |
| 2015/0032628 A1* | 1/2015 | Randall | ................. | G06Q 20/40 |
| | | | | 705/44 |
| 2016/0086184 A1* | 3/2016 | Carpenter | ......... | G06Q 20/4016 |
| | | | | 705/44 |
| 2016/0189144 A1* | 6/2016 | Dayalan | ............... | G06Q 20/401 |
| | | | | 705/65 |
| 2016/0239842 A1* | 8/2016 | Cash | ...................... | G06Q 20/42 |
| 2017/0180389 A1* | 6/2017 | Kozolchyk | ........... | H04L 63/105 |
| 2018/0005220 A1* | 1/2018 | Laracey | ................. | H04W 4/80 |

* cited by examiner

SYSTEMS AND METHODS FOR DETECTING SECURITY RISKS IN NETWORK PAGES

FIELD OF DISCLOSURE

The present disclosure relates generally to the field of secure network transactions and, more particularly, to systems and methods for detecting security risks in online pages.

BACKGROUND

One reality of the modern Internet-connected world is that the storage and transfer of sensitive and secure electronic data is potentially vulnerable to data breaches. Further, as electronic systems, such as point of sales ("POS") systems, become more complex, and as hackers become more sophisticated, security concerns are continually increasing.

In the early days of electronic transactions, dedicated magnetic card readers would scan unencrypted sensitive data on a credit card and transfer it to a transaction service for completion of the transaction. These communications were typically made over a dial-up connection and required basic encryption in the reader device in order to maintain security of the packet.

Over time, the reader devices have become more advanced, often with Internet connections and data input ports that enable malware to infect POS terminals. Further, as more and more merchants have moved to transfer data over the Internet, additional security features have been developed.

Most notably, "tokenization" is a means for replacing sensitive data with a "token" of data that may be non-decryptable or non-detokenizable by the merchant or other tokenization users (e.g. because they require third party decryption). Merchants, for example, might not ever store sensitive data themselves, thus enhancing data security. However, security problems remain, even in systems utilizing tokenization.

SUMMARY

Included are embodiments for detecting security risks in network pages. Some embodiments include a method comprising providing at least one secure transaction page to a secure transaction provider, the secure transaction page enabling the secure transaction provider to request secure transactions, determining a request rate for the secure transaction page associated with the secure transaction provider, determining a predetermined threshold for a change in request rate for the secure transaction page by the secure transaction provider, determining that the predetermined threshold, for the change in request rate for the secure transaction page by the secure transaction provider, has been exceeded, and providing a notification to the secure transaction provider based on the determination that the predetermined threshold, for the change in request rate for the secure transaction page by the secure transaction provider, has been exceeded.

Also included are embodiments of a system. Some embodiments of the system include a data storage device storing instructions for detecting security risks in network pages, and a processor configured to execute the instructions to perform a method comprising providing at least one secure transaction page to a secure transaction provider, the secure transaction page enabling the secure transaction provider to request secure transactions, determining a request rate for the secure transaction page associated with the secure transaction provider, determining a predetermined threshold for a change in request rate for the secure transaction page by the secure transaction provider, determining that the predetermined threshold, for the change in request rate for the secure transaction page by the secure transaction provider, has been exceeded, and providing a notification to the secure transaction provider based on the determination that the predetermined threshold, for the change in request rate for the secure transaction page by the secure transaction provider, has been exceeded.

Also included are embodiments of a computer-readable medium. Some embodiments of the computer-readable medium include a non-transitory computer-readable medium storing instructions that, when executed by a transaction processor, cause the transaction processor to perform a method for detecting security risks in network pages, the method comprising providing at least one secure transaction page to a secure transaction provider, the secure transaction page enabling the secure transaction provider to request secure transactions, determining a request rate for the secure transaction page associated with the secure transaction provider, determining a predetermined threshold for a change in request rate for the secure transaction page by the secure transaction provider, determining that the predetermined threshold, for the change in request rate for the secure transaction page by the secure transaction provider, has been exceeded, and providing a notification to the secure transaction provider based on the determination that the predetermined threshold, for the change in request rate for the secure transaction page by the secure transaction provider, has been exceeded.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

The accompanying drawings, which are incorporated in and constitute a part of this specification, illustrate several embodiments and together with the description, serve to explain the principles of the disclosure.

DESCRIPTION OF THE EMBODIMENTS

The present disclosed embodiments will now be described in detail with reference to several examples thereof as illustrated in the accompanying drawings. In the following description, numerous specific details are set forth in order to provide a thorough understanding of embodiments of the present disclosure. It will be apparent, however, to one skilled in the art, that embodiments may be practiced without some or all of these specific details. In other instances, well known process steps and/or structures have not been described in detail in order to not unnecessarily obscure the present embodiments. The features and advantages of embodiments may be better understood with reference to the drawings and discussions that follow.

The following discussion relates to methods and system for detecting security risks in network pages, for example, within a merchant card data environment (CDE). Risks and/or vulnerabilities may be detected, logged, and/or alerted. Such systems and methods ensure increased security, for example, for secure transactions, while still enabling merchants and other transacting parties to quickly set up and execute transactions. Such systems and methods may also allow for merchants and other transacting parties to customize security features so that security warnings and actions can be tailored for the needs of the transacting party. Risks may include, for example, risk of theft or a business risk where systems cannot process payments.

It should be appreciated that particular consideration is made herein to credit card transactions due to the prevalence of these transactions. Despite this reference to credit cards, certain disclosed systems and methods may apply equally well to the transfer of any sensitive data, whether "card present" or "card not present" (CNP). Disclosed systems and methods may apply, for example, in online transactions where a user is not physically present at a merchant location. Transactions may include debit transactions, gift card transactions, PayPal transactions, BitCoin transactions, smart card transactions, mobile application transactions, and the usage of loyalty cards, to name a few. Effectively, any circumstance where sensitive data, such as a personal account number (PAN), social security number, etc., or token corresponding thereto, is being transmitted over a network, systems and methods disclosed herein may be employed. Further, while the party seeking to initiate a secure transaction and/or provide a third-party service may be referred to herein as a "merchant" a party seeking to initiate a secure transaction need not be a merchant, but may be a service provider, or any party seeking to execute a transaction.

Figure 1:
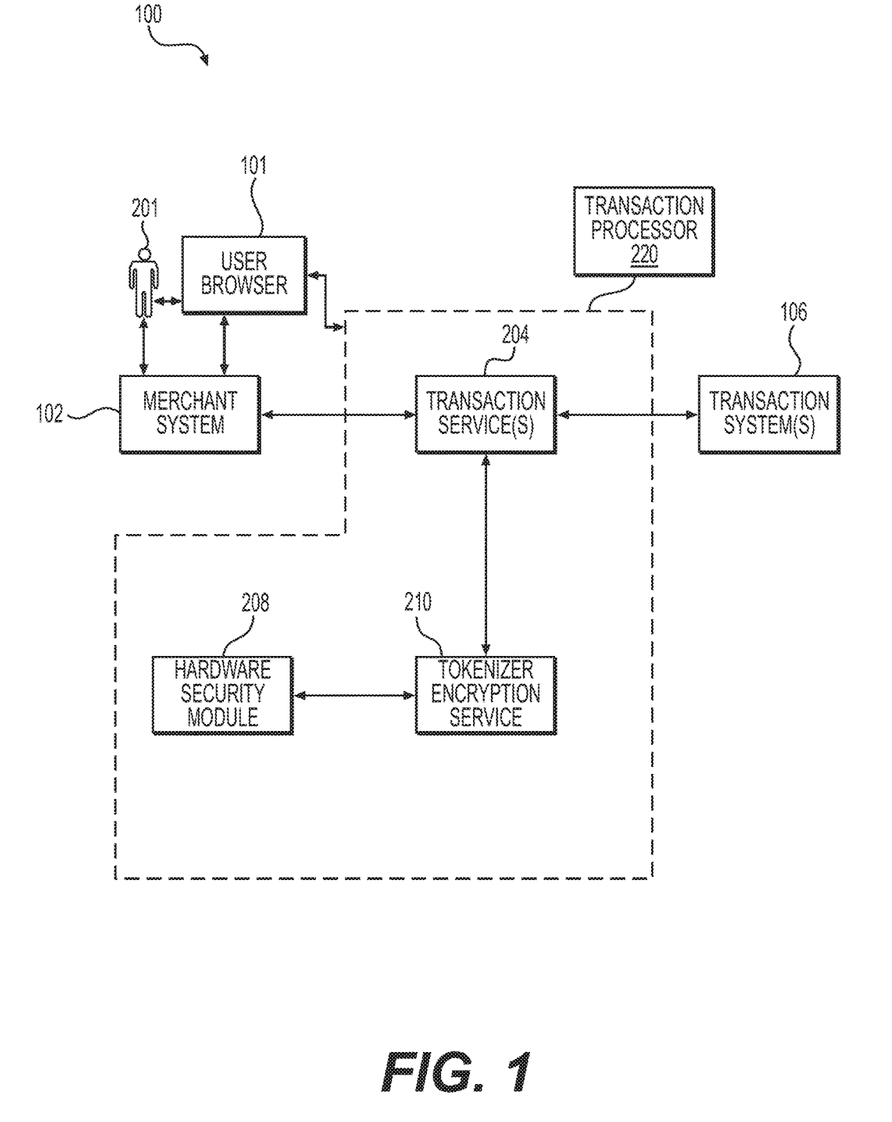
FIG. 1 is an example schematic block diagram of a system for tokenization, according to techniques presented herein.

FIG. 1 depicts a system 100 with a merchant system 102, such as a merchant point of sale ("POS") system(s), terminal(s), and/or server, that may collect credit card information (or other sensitive data) and transfer the data securely to the transaction system(s) 106, which may be a payment system(s), via an intermediary such as a transaction processor 220. The user 201 may provide sensitive data directly, such as at a POS terminal at a retail location, or via, for example, remotely via a user browser 101. The user browser 101 may interact with the merchant system 102, and/or directly with the transaction processor 220. The user browser 101 may be a client-side browser on a user computing device, but may also be a client-side app, or any other type of client-side data processor. The user browser 101 may display a secure transaction page for the user, which may comprise a secure page hosted by the transaction processor 220, or may comprise a page hosted by, for example, the merchant browser, but with an embedded frame or other embedded web component that may be hosted elsewhere, such as from the transaction processor 220. Sensitive data may be collected by one or more third-party hosted elements, rather than by, for example, client side elements, such as JavaScript elements, as a compromised frame may be easier to detect than compromised client script. A third-party element may include a frame, such as an iFrame. A frame is part of a web page or browser window that displays content independent of its container, with the ability to load content independently. For example, a merchant page may host a frame embedding a page displayed from the transaction processor 220. Using frames or pages hosted by third parties, merchants and other secure transaction providers may avoid having sensitive data entered into their own systems, thereby enhancing security and reducing the risk of fraud. While the term "merchant" is used herein, techniques provided herein may be used with any secure transaction provider. Further, while the term "secure transaction page" may be used herein, this term may encompass more than one page, or one or more elements or sub-portions of an electronic or network page.

The merchant system 102 may be a payment terminal (e.g., a "pin pad"), or, a data server, for example, displaying a merchant's e-commerce store. A transaction processor 220, such as a payment processor, may be an intermediary in this system to ensure validity of the request, and may generate a token. The token may be, for example, a randomly generated number. The token, which may also be referred to as a "high-value token" herein, may also be a pseudorandom number, encrypted information, or other character sequence. The transaction system(s) 106 may securely return a transaction response to merchant system 102, along with the token generated by the transaction processor and/or transaction system 106.

The token may be unique per transaction, customer/person or account number per merchant or organization. Thus, if a given user makes a purchase at merchant A, token A may be generated, but if a given user makes a purchase at merchant B, even if using the same credit card, token B may be generated.

By relying upon a token, a merchant system 102 is no longer required to send credit card information or other sensitive data for subsequent transactions, and may instead use the token, such as for follow-up activities. For example, a restaurant may initially run a transaction for the cost of a meal, and perform a follow-up transaction using the token for processing the tip. Alternatively, in a card-not-present context, an online merchant may run multiple transactions for a recurring web subscription using one or more tokens. Another example may include recurring transactions for a gym membership. A merchant may use tokens for returns or price adjustments rather than resending sensitive transaction information over a network. Using tokenization, a merchant or merchant may enhance security by not storing sensitive data of customers on its own systems. However, as will be discussed further below, this may create problems, as merchants may require sensitive data to perform their services.

As an example, a user 201, such as a customer or purchaser, may interact with merchant system 102 and/or user browser 101 to initiate a transaction, such as to pay for a good or service. In a physical environment, the user 201 may provide a magnetically stored account number and/or expiration number in the form of a credit card, but any form of sensitive data may be used, in some embodiments. In the e-commerce environment, the user 201 may type the credit card account number and expiration date into the user's computing device, for example in the user browser 101. Techniques presented herein may also be used in a mail order/telephone order (MOTO) environment, manual entering of account information or credit card numbers, etc.

It should also be appreciated that multiple encryption schemas may be used with techniques presented herein, such as, for example, strong encryption.

In one embodiment, the merchant system 102 and/or user browser 101 may provide the collected account information (and/or other sensitive data) to a transaction service(s) 204, such as payment service(s), in the tokenization and transaction processor 220 (e.g., payment management system or payment processor). This transfer of data may be performed over a telecommunications network, for example, the Internet, or via any other type of network. Transaction service(s) 204 may include a plurality of systems for receiving the data, dependent upon transmission mechanism and data type, as will be discussed in greater detail below. The transaction service(s) 204 may perform an initial check for encryption of the data. If the received data is not encrypted, the received data may be transferred promptly to transaction system(s) 106 for transfer of funds, or directly to entities such as Visa, MasterCard, etc. Transaction system(s) 106 may be operated by entities such as Global Card Bank, for example. However, where encryption is present, and/or tokenization is desired, transaction service(s) 204 may transfer the information to a tokenizer service 210 for processing. Transaction service(s) 204 may validate the encrypted block, encrypted key, and/or reader serial number lengths. It may also validate the merchant's ID with a stored database of terminal IDs.

Tokenizer service 210 may further validate credentials and identify keys for the encrypted data. The data may further be submitted to a hardware security module 208 for decryption and for the generation of a token. The token may include a PAN, an expiration date for the token, and/or an expiration date for the card. Tokens might also not themselves contain any sensitive data, but rather merely correspond to sensitive identification data such as social security numbers, account information, or other sensitive financial data, such as cardholder data. The sensitive data may be stored securely at the transaction processor 220 or elsewhere.

In some embodiments, any expiration date of the token, if present, may be varied depending upon whether the token is designated as a single use token or as a token for recurring transactions (i.e., a subscription). For example, a one-year and two-year expiration may be provided for single use and recurring tokens, respectively, which allows for a longer validity period where the merchant is anticipating reuse of the token, and ensures that single use tokens are not stored longer than necessary.

The token, which may be encrypted, and clear text of the data supplied by merchant system 102, may be returned to tokenizer service 210 and subsequently to transaction service(s) 204. Transaction service(s) 204 may transfer the clear text to transaction system(s) 106 for a transaction response. The response may then be provided, along with the token, back to the merchant, such as to the merchant system 102. The merchant may then store the encrypted token for later transactions.

Thus, the merchant may be prevented from accessing sensitive data or keys, which may be maintained within hardware security module 208 or elsewhere in a secured location accessible to the transaction processor 220. Thus, for account information to be compromised, both the merchant system 102 (or other merchant storage) and the transaction processor 220 would need to be breached. Alternatively, sensitive data may be stored exclusively within the transaction processor 220.

Figure 2:
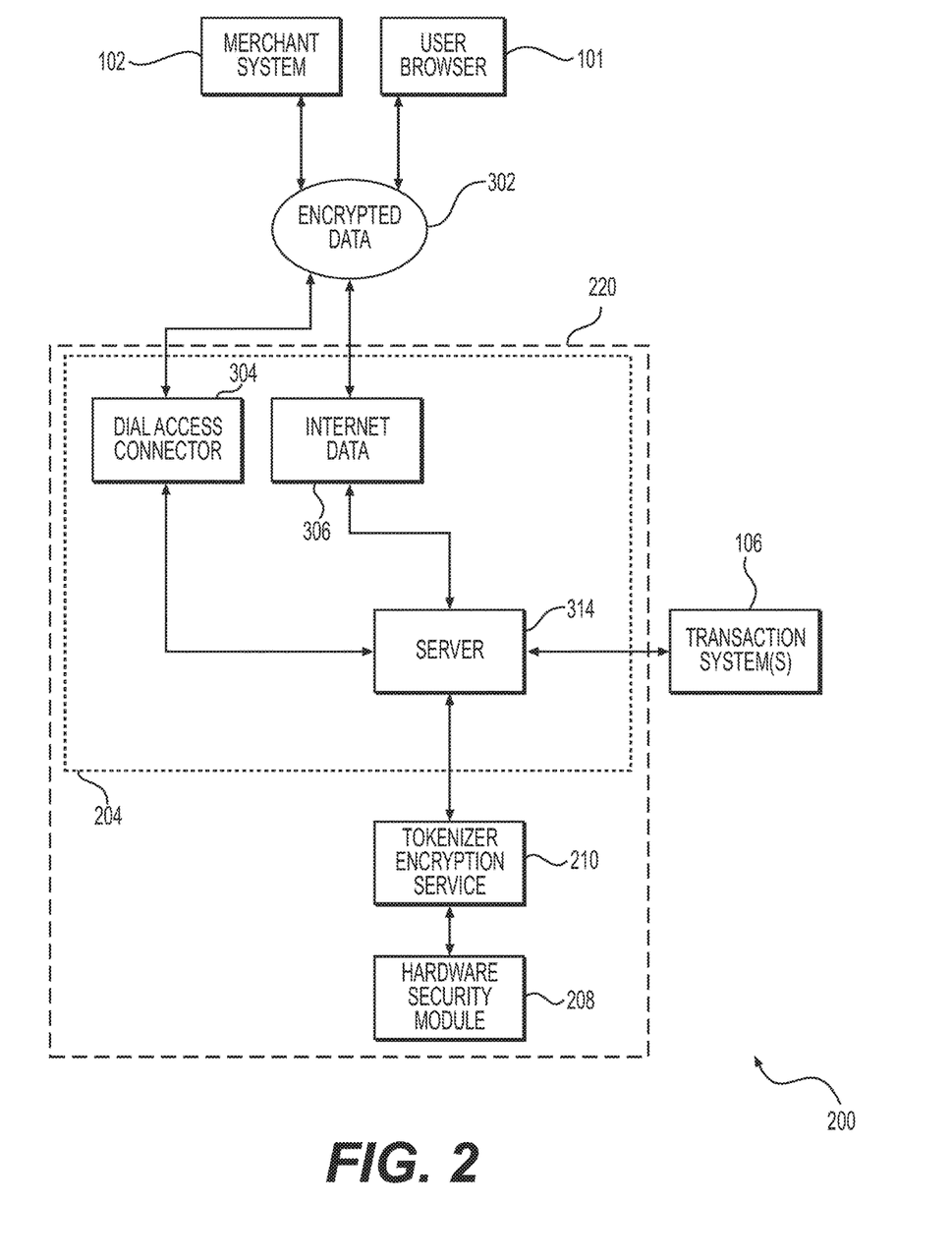
FIG. 2 is an example schematic block diagram for a more detailed view of components within the tokenization system and transaction processor, in accordance with some embodiments.

FIG. 2 is an example schematic block diagram for a more detailed view of components within the tokenization system and transaction processor 220, in accordance with some embodiments. In this example block diagram, unencrypted data or encrypted data 302 from the merchant system 102 and/or user browser 101 may be delivered to the transaction processor 220, such as to transaction service(s) 204, via, for example, a dial-up access connector 304, or Internet data connection 306, through which data may pass, for example, via network socket and/or web service. Although a dial-up access connector 304 and Internet data 306 connections are shown, any type of data connection may be established for data transfer purposes. Incoming data may be provided to server 314.

In addition to the server 314, other servers may be included, in alternate embodiments, in order to handle any data inputs. For example, in embodiments where gift cards or loyalty cards are being processed, the system may include a gift card server or loyalty card server. The system may be scalable to take any number of payment types, as is desirable for any particular scenario.

The server 314 may determine whether a token is present and/or if data is encrypted. If the data is not encrypted and the merchant is not set up for tokenization, the clear text data may be transferred to the transaction system(s) 106 (such as Global Card Bank, Visa, etc.) for approval or declining. Otherwise, if the data includes a token or encrypted data, or if tokenization is otherwise requested, the data may be provided to tokenizer service 210, as previously discussed.

Figure 3:
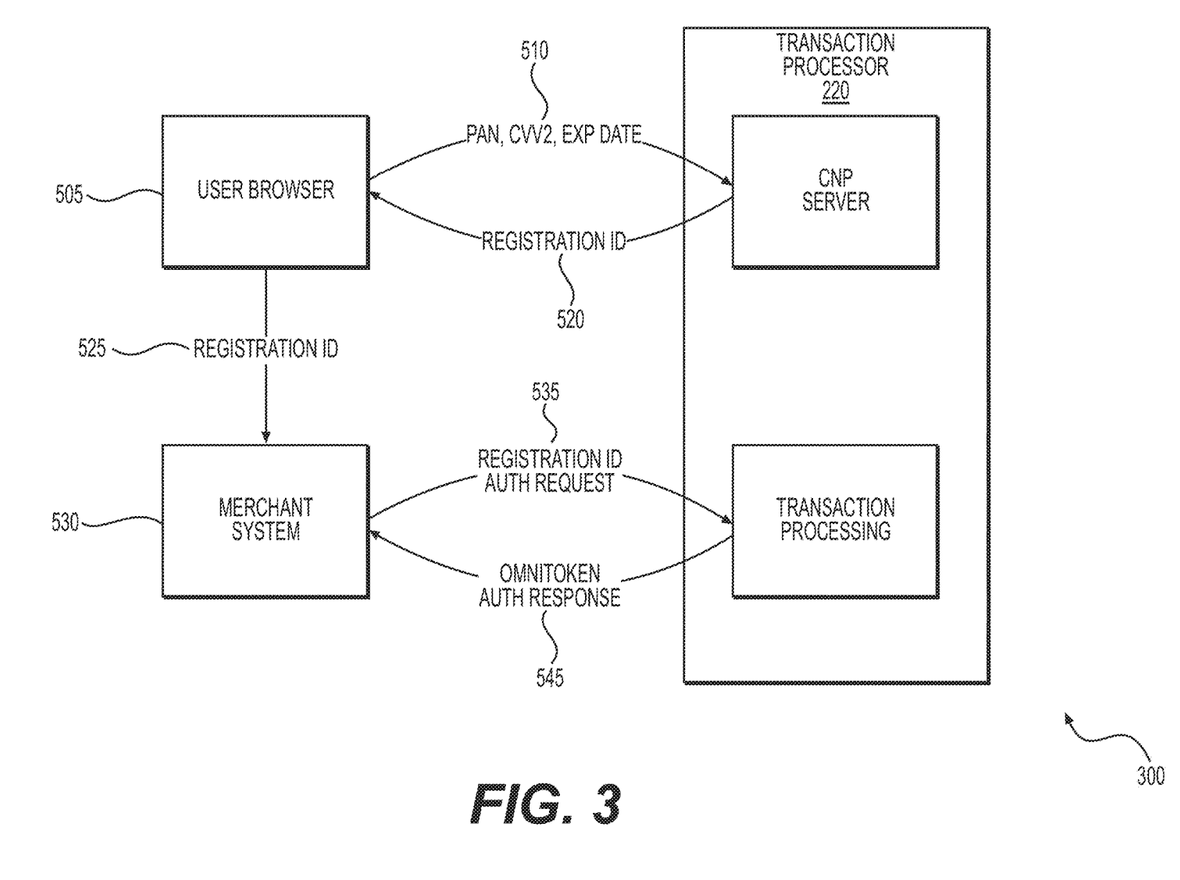
FIG. 3 is an example schematic block diagram of a tokenizer service, according to techniques presented herein.

FIG. 3 is a block diagram illustrating a method of performing an online transaction utilizing tokens where a user may initiate a card-not-present (CNP) transaction using, for example, a browser 101. Security risks for both the customer and the merchant may be particularly high in a CNP scenario. If merchants were to store sensitive data of customers, for example, they would be exposing themselves to legal liability in the event of a security breach. One solution to this problem is to prevent the merchant from ever obtaining the sensitive data at all.

In a CNP transaction, at step 505 a user 201 may enter, into a browser 102, sensitive data such as, but not limited to, a personal account number (PAN), a card verification value (CVV), and/or an expiration date of the card, for example in order to execute an online purchase. This information may be entered in a web form that appears to the user to be owned by the merchant, but the form may actually be hosted by a third party, such as transaction processor 220 via, for example, an iFrame, as discussed above.

The iFrame, or other third-party hosted content, may be loaded by a Content Delivery Network (CDN), which may accelerate content delivery. The third-party hosted content, such as the iFrame, may contain logic, such as JavaScript, to encrypt the sensitive data with an encryption key. The encryption key, for example, may utilize 24-hour public-private key pair known only to the transaction processor 220.

At step 510, the sensitive data may be transferred to the transaction processor 220, such as a payment processor. A server such as a CNP Server, which may be server 314 or transaction services 204, may receive the sensitive data, which may be encrypted, and provide a registration identifier 520 back to the user browser 101. The registration identifier 520 may be a randomly generated, non-sensitive, low-value token that acts as a replacement for the PAN and/or other sensitive data.

At step 525, the registration identifier 520 may be provided to the merchant system 101, such as an e-commerce server. The merchant's system may provide the registration identifier 520 to a transaction processing unit, which may be, for example, server 314 or transaction services 204. The transaction processor 220 may convert the registration identifier 520 to a high-value token and/or authorization response 545, which may be provided to the merchant's server 101. The high-value token 545 may be reused by the merchant for subsequent transactions, as discussed above. While transaction processing and at least one CNP server are depicted as sending and receiving data, any entity in the transaction processor may perform the steps depicted in FIG. 3, including server 314 or transaction services 204.

Using systems and methods such as those of FIG. 3, sensitive data such as cardholder data might not ever be transmitted to the merchant's systems, because the webpage displayed in the user browser at step 505, or a portion thereof, may be hosted by the transaction processor 220.

While preventing the merchant from having access to sensitive data may enhance security, other security risks may remain. As discussed above, the user browser 101 may host a frame on one or more secure transaction pages, or other third-party hosted content such as embedded content. Alternatively, the user browser 101 may simply link to or redirect to a secure transaction page, such as a payment page, hosted from/by the third party, such as from the transaction processor 220. A malicious party may attempt to compromise the user browser 101, or other system of the merchant or secure transaction provider. Link(s) to the third party content may be altered, for example, such that the user 201 would be entering sensitive data into a form hosted by the malicious party. Malicious code may be inserted which allows the logging of sensitive data. Alternatively, the iFrame might be replaced with an iFrame containing content hosted by the malicious party. The attacker may not be able to infiltrate the contents of the frame, but may be able to manipulate the frame's embedding on the web page. This may allow the malicious party to obtain payment data and conduct unauthorized transactions. A solution is needed to identify, log, and/or proactively report these risks to stakeholders to remediate any issues.

Figure 4:
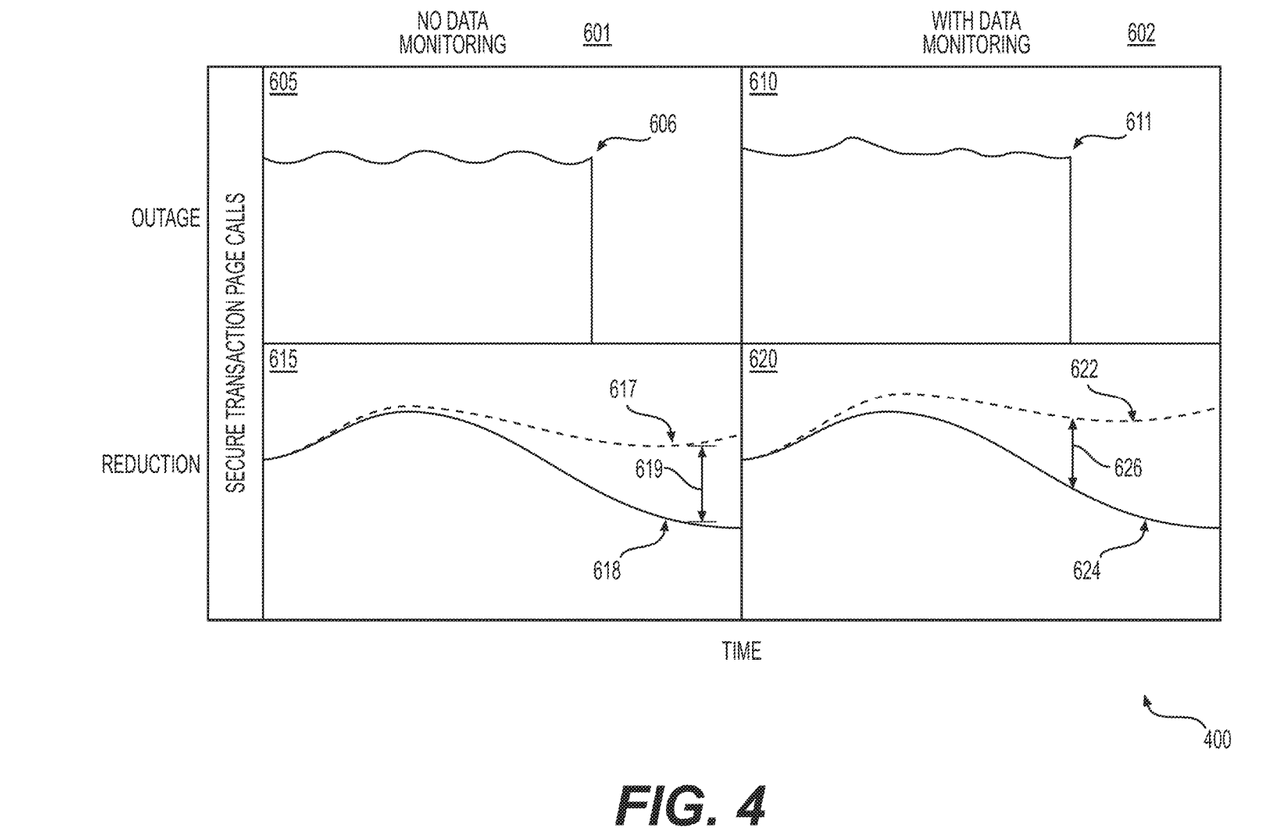
FIG. 4 is a graph illustrating methods to detect security risks in secure transaction pages.

FIG. 4 is a graph illustrating methods 400 to detect security risks in secure transaction pages. Transaction data, such as IP addresses, timestamps, etc., and events, such as events in the browser 101, may be monitored and/or logged, and may be provided to third parties such as the transaction processor 220, for example, during or after a security event. This may be referred to as "data monitoring" that produces "monitoring data." Monitoring data may be collected to identify trends, behaviors, and to arrive at a risk-based score. Risk-based scores could result in an event alert to stakeholders. Monitoring data may be provided to the transaction processor 220. The transaction processor 220 may use secure transaction request data and/or monitoring data to detect security risks and/or breaches of the secure transaction provider, such as at browser 101.

Column 601 discloses several possible behaviors in the event that there is no monitoring data. In instance 605, secure transaction page calls made by the secure transaction provider, such as a merchant, may be monitored by the transaction processor 220. If there is a sudden stoppage 606 of secure transaction page calls, the transaction processor 220 may perform one or more actions in response. The transaction processor may decline any future transaction requests related to the merchant. For example, if the merchant systems are down, yet tokens associated with the merchant, along with transaction requests, as still being received, the transaction requests may be denied. Alternatively or in addition, the merchant may be notified of the stoppage 606 of secure transaction page calls, as this may be an indication that the merchant's secure transaction pages have been compromised. The action performed in response to the stoppage may be viewable and/or modifiable by the merchant.

In instance 615, secure transaction page calls made by the secure transaction provider, such as a merchant, may be monitored by the transaction processor 220. The transaction processor 220 may collect data to analyze trends, behaviors, and/or data points. The transaction processor 220 may monitor the history of secure transaction page calls made by the merchant and/or by similar merchants, and from this determine an expectation as to how many secure transaction page calls should be received 617. This expectation may be based on the size of the merchant, the time of day, week, or year, the date, exogenous event data (for example, persistent rains drive up demand at an umbrella company), network outage information, etc. However, if the actual number of secure transaction page calls 618 deviates more than a first predetermined threshold 619, the transaction processor 220 may institute an action. The transaction processor 220 may stop approving further secure transactions associated with the merchant. The transaction processor 220 may also, or alternatively, notify the merchant of the deviation from the expectation. The action performed and expectation determined may be viewable and/or modifiable by the merchant. For example, a slowdown of more than 10% (or some other predetermined value) of secure transaction page calls over a predetermined time period may cause the transaction processor 220 to notify the merchant.

Column 602 illustrates several possible behaviors in the event that data monitoring is in place. Data monitoring may include change detection mechanisms such as file integrity monitoring tools that may detect unauthorized modification of critical system files, configuration files, and/or content files. The secure transaction data, for example from the change detection mechanisms, or other event data, may be provided to the transaction processor 220, and may help determine and/or more quickly react to security events. Browser analytics capabilities may be installed at browser 101, and cycle times for loading the browser and web pages may be monitored. Times for making a call to the transaction processor 220 may also be monitored. Browser activities may be tracked, as well as browser versions, event timestamps, and other analytics. Monitored data may also include system status messages sent from the merchant to the transaction processor 220, for example, including outage or expected downtime information. The merchant may also send "system OK" or similar status updates to the transaction processor 220 at predetermined times and/or at regular time intervals.

In instance 610, a stoppage 611 in secure transaction page calls may be detected. If there is there is an indication of the stoppage in the monitored data, for example if the merchant provided data to the transaction processor 220 that the stoppage 611 would occur, the transaction processor 220 may continue to process transaction requests received from the merchant as normal. However, if there is no indication that the stoppage 611 would occur, the transaction processor 220 may react differently than in the no data monitoring instance 605. For example, the transaction processor 220 may be more likely to deny all transaction requests associated with the merchant. The transaction processor 220 may deny new token requests, or may deny only CNP token requests, but may, for example, still process received high-value tokens associated with the merchant. The transaction processor 220 may also be more likely to alert the merchant that there may be a possible security breach. The action performed in response to the detection of a stoppage 611 may be viewable and/or modifiable by the merchant.

In the instance 620, rather than a stoppage, a slowdown 624 in secure transaction page calls may be detected in a data monitoring scenario. As in the no data monitoring scenario 615, an expected number of secure transaction page calls 622 may be determined. However, in the data monitoring scenario, the transaction processor 220 and/or merchant may react differently than in the no data monitoring scenario 615. For example, if the actual number of secure transaction page calls 624 deviates by a second predetermined threshold 626, the transaction processor 220 may institute an action. However, if there was no reason to expect the slowdown given the monitored data, the second predetermined threshold 626 may be smaller than the first predetermined threshold 619. Further, if the monitored data comprises unexpected anomalies, such as if unexpected file changes are detected, the second predetermined threshold 626 may again be smaller, and the transaction processor 220 may be more likely to institute an action. With a smaller second predetermined threshold 626, the transaction processor may be more likely to deny transaction requests associated with the merchant and/or notify the merchant of the detected anomalies and possible security events. Conversely, if the monitored data suggests a legitimate reason for a reduction in secure transaction page calls, the second predetermined threshold 626 may be larger than the first predetermined threshold 619. For example, if the merchant has informed the transaction processor 220 that one or several sites is going down for maintenance, a subsequent reduction in secure transaction page calls may be expected, and the second predetermined threshold 626 may be larger than the first predetermined threshold 619. With a larger second predetermined threshold 626, the transaction processor 220 may be less likely to notify the merchant of the possible security problem. The transaction processor 220 may further deny any new token requests, or may deny only CNP token requests, but may, for example, still process received high-value tokens associated with the merchant. The action performed and expectation determined may be viewable and/or modifiable by the merchant. For example, a slowdown of more than 10% (or some other predetermined value) of secure transaction page calls over a predetermined time period may cause the transaction processor 220 to notify the merchant.

Figure 5:
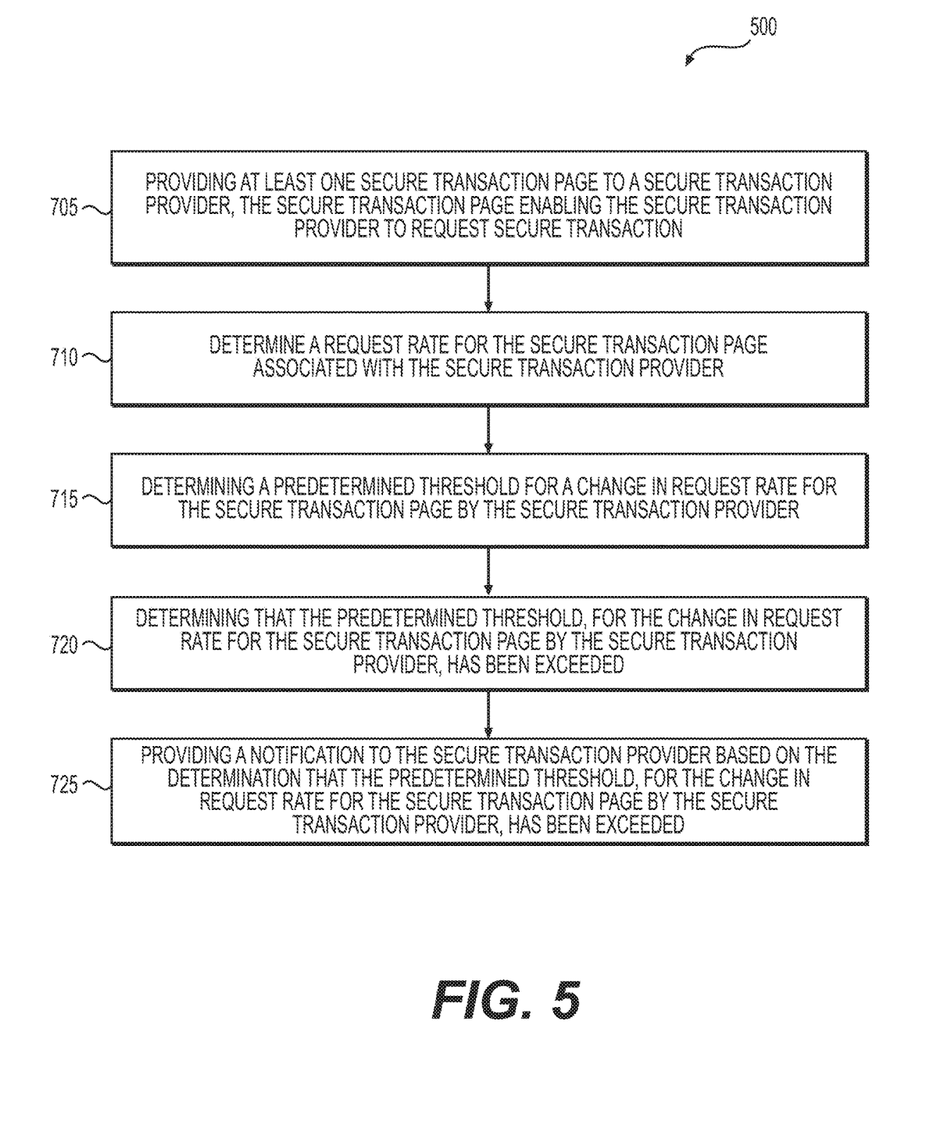
FIG. 5 is a block diagram illustrating a method to detect security risks in secure transaction pages, according to techniques presented herein.

FIG. 5 is a flow diagram illustrating a method to detect security risks in secure transaction pages, according to techniques presented herein. Step 705, discloses providing at least one secure transaction page to a secure transaction provider, the secure transaction page enabling the secure transaction provider to request secure transactions. Step 710 discloses determining a request rate for the secure transaction page associated with the secure transaction provider. Step 715 discloses determining a predetermined threshold for a change in request rate for the secure transaction page by the secure transaction provider. Step 720 discloses determining that the predetermined threshold, for the change in request rate for the secure transaction page by the secure transaction provider, has been exceeded. Step 725 discloses providing a notification to the secure transaction provider based on the determination that the predetermined threshold, for the change in request rate for the secure transaction page by the secure transaction provider, has been exceeded.

Techniques presented herein related to techniques for determining security risks in network pages, such as secure transaction pages, that improve the technical fields of tokenization and network security. Techniques presented herein enable a merchant to comply with the Payment Card Industry Data Security Standard (PCI DSS) in a manner that builds value, preserves risk reduction, enables a cost-effective architecture, and that does not dilute the original value proposition. Presented techniques allow transaction processors and secure transaction providers, such as merchants, the ability to more readily identify possible security threats and prevent unauthorized transactions, such as unauthorized sales. User activity data may be shared between merchants without sharing the sensitive data, such as the PAN, with which the data is associated. Techniques presented herein also reduce added complexity in the merchant environment, as merchants may merely have to embed an iFrame, a simple web element, yet are still able to obtain security protections described herein. Further, techniques presented herein solve a problem arising in the post-Internet era, namely, for example, a need to securely share electronic data across networks with parties that may not be trusted, and the need to quickly identify when secure network pages have been compromised. Techniques presented herein identify certain techniques of enhancing network security without preempting all means of enhancing network security.

In addition to a standard desktop, or server, it is fully within the scope of this disclosure that any computer system capable of the required storage and processing demands would be suitable for practicing the embodiments of the present disclosure. This may include tablet devices, smart phones, pin pad devices, and any other computer devices, whether mobile or even distributed on a network (i.e., cloud based).

In addition, embodiments of the present disclosure further relate to computer storage products with a computer-readable medium that have computer code thereon for performing various computer-implemented operations. The media and computer code may be those specially designed and constructed for the purposes of the present disclosure, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

While the present disclosure has been described in terms of several embodiments, there are alterations, modifications, permutations, and substitute equivalents, that fall within the scope of this disclosure.

It should also be noted that there are many alternative ways of implementing the methods and systems of the present disclosure. It is therefore intended that the following appended claims be interpreted as including all such alterations, modifications, permutations, and substitute equivalents as fall within the true spirit and scope of the present disclosure.

What is claimed is:

1. A method for detecting security risks in network pages, comprising:

providing at least one secure transaction page to a secure transaction provider, the secure transaction page enabling the secure transaction provider to request secure transactions;

determining an expected request rate for the secure transaction page by the secure transaction provider based on a history of request rate for the secure transaction page;
determining an actual request rate for the secure transaction page by the secure transaction provider, the actual request rate being indicative of a number of calls for the secure transaction page over a predetermined time period;
determining a first predetermined threshold for a change in request rate for the secure transaction page by the secure transaction provider, the change in request rate representing a difference between the expected request rate and the actual request rate;
determining that the first predetermined threshold, for the change in request rate for the secure transaction page by the secure transaction provider, has been exceeded, with the actual request rate being lower than the expected request rate by an amount exceeding the first predetermined threshold;
in response to determining that the first predetermined threshold, for the change in request rate for the secure transaction page by the secure transaction provider, has been exceeded, declining at least one of a new token request or a card-not-present (CNP) token request from the secure transaction provider;
providing a notification to the secure transaction provider based on the determination that the first predetermined threshold, for the change in request rate for the secure transaction page by the secure transaction provider, has been exceeded;
receiving secure transaction data from the secure transaction provider; and
determining a second predetermined threshold, the second predetermined threshold being lower than the first predetermined threshold, for a change in request rate for the secure transaction page by the secure transaction provider, based on the secure transaction data from the secure transaction provider.

2. The method of claim 1, wherein determining the first predetermined threshold for the change in request rate comprises:
comparing the actual request rate with the expected request rate to determine the first predetermined threshold for the change in request rate.

3. The method of claim 1, further comprising:
receiving sensitive data corresponding to an account via the secure transaction page from the secure transaction provider;
generating a token corresponding to the sensitive data; and
providing the token corresponding to the sensitive data to the secure transaction provider.

4. The method of claim 1, further comprising:
determining whether the secure transaction page is functioning;
receiving an electronic transaction request associated with the secure transaction provider; and
in response to determining that the secure transaction page is not functioning, declining the electronic transaction request.

5. The method of claim 1, wherein the secure transaction provider is an online merchant.

6. The method of claim 1, wherein the secure transaction page is an iFrame hosted by a third party, such that sensitive data received via the secure transaction page is isolated from the secure transaction page.

7. A system for detecting security risks in network pages, the system comprising:
a data storage device storing instructions for detecting security risks in secure transaction pages; and
a processor configured to execute the instructions to perform a method comprising:
providing at least one secure transaction page to a secure transaction provider, the secure transaction page enabling the secure transaction provider to request secure transactions;
determining an expected request rate for the secure transaction page by the secure transaction provider based on a history of request rate for the secure transaction page;
determining an actual request rate for the secure transaction page by the secure transaction provider, the actual request rate being indicative of a number of calls for the secure transaction page over a predetermined time period;
determining a first predetermined threshold for a change in request rate for the secure transaction page by the secure transaction provider, the change in request rate representing a difference between the expected request rate and the actual request rate;
determining that the first predetermined threshold, for the change in request rate for the secure transaction page by the secure transaction provider, has been exceeded, with the actual request rate being lower than the expected request rate by an amount exceeding the first predetermined threshold;
in response to determining that the first predetermined threshold, for the change in request rate for the secure transaction page by the secure transaction provider, has been exceeded, declining at least one of a new token request or a card-not-present (CNP) token request from the secure transaction provider;
providing a notification to the secure transaction provider based on the determination that the first predetermined threshold, for the change in request rate for the secure transaction page by the secure transaction provider, has been exceeded;
receiving secure transaction data from the secure transaction provider; and
determining a second predetermined threshold, the second predetermined threshold being lower than the first predetermined threshold, for a change in request rate for the secure transaction page by the secure transaction provider, based on the secure transaction data from the secure transaction provider.

8. The system of claim 7, wherein determining the first predetermined threshold for the change in request rate comprises:
comparing the actual request rate with the expected request rate to determine the first predetermined threshold for the change in request rate.

9. The system of claim 7, the processor executing a method further comprising:
receiving sensitive data corresponding to an account via the secure transaction page from the secure transaction provider;
generating a token corresponding to the sensitive data; and
providing the token corresponding to the sensitive data to the secure transaction provider.

10. The system of claim 7, the processor executing a method further comprising:
- determining whether the secure transaction page is functioning;
- receiving an electronic transaction request associated with the secure transaction provider; and
- in response to determining that the secure transaction page is not functioning, declining the electronic transaction request.

11. The system of claim 7, wherein the secure transaction provider is an online merchant.

12. The system of claim 7, wherein the secure transaction page is an iFrame hosted by a third party, such that sensitive data received via the secure transaction page is isolated from the secure transaction page.

13. A non-transitory computer-readable medium storing instructions that, when executed by a transaction processor, cause the transaction processor to perform a method for detecting security risks in network pages, the method comprising:
- providing at least one secure transaction page to a secure transaction provider, the secure transaction page enabling the secure transaction provider to request secure transactions;
- determining an expected request rate for the secure transaction page by the secure transaction provider based on a history of request rate for the secure transaction page;
- determining an actual request rate for the secure transaction page by the secure transaction provider, the actual request rate being indicative of a number of calls for the secure transaction page over a predetermined time period;
- determining a first predetermined threshold for a change in request rate for the secure transaction page by the secure transaction provider, the change in request rate representing a difference between the expected request rate and the actual request rate;
- determining that the first predetermined threshold, for the change in request rate for the secure transaction page by the secure transaction provider, has been exceeded, with the actual request rate being lower than the expected request rate by an amount exceeding the first predetermined threshold;
- in response to determining that the first predetermined threshold, for the change in request rate for the secure transaction page by the secure transaction provider, has been exceeded, declining at least one of a new token request or a card-not-present (CNP) token request from the secure transaction provider;
- providing a notification to the secure transaction provider based on the determination that the first predetermined threshold, for the change in request rate for the secure transaction page by the secure transaction provider, has been exceeded;
- receiving secure transaction data from the secure transaction provider; and
- determining a second predetermined threshold, the second predetermined threshold being lower than the first predetermined threshold, for a change in request rate for the secure transaction page by the secure transaction provider, based on the secure transaction data from the secure transaction provider.

14. The computer-readable medium of claim 13, wherein determining the first predetermined threshold for the change in request rate comprises:
- comparing the actual request rate with the expected request rate to determine the first predetermined threshold for the change in request rate.

15. The computer-readable medium of claim 13, the transaction processor performing a method further comprising:
- receiving sensitive data corresponding to an account via the secure transaction page from the secure transaction provider;
- generating a token corresponding to the sensitive data; and
- providing the token corresponding to the sensitive data to the secure transaction provider.

16. The computer-readable medium of claim 13, the transaction processor performing a method further comprising:
- determining whether the secure transaction page is functioning;
- receiving an electronic transaction request associated with the secure transaction provider; and
- in response to determining that the secure transaction page is not functioning, declining the electronic transaction request.

17. The computer-readable medium of claim 13, wherein the secure transaction provider is an online merchant.

* * * * *